United States Patent
Nagata et al.

(10) Patent No.: US 11,059,281 B2
(45) Date of Patent: Jul. 13, 2021

(54) METHOD OF PRODUCING LAMINATE MATERIAL

(71) Applicant: SHOWA DENKO PACKAGING CO., LTD., Kanagawa (JP)

(72) Inventors: Kensuke Nagata, Kanagawa (JP); Tsutomu Ganse, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 92 days.

(21) Appl. No.: 16/307,820

(22) PCT Filed: May 30, 2017

(86) PCT No.: PCT/JP2017/020110
§ 371 (c)(1),
(2) Date: Dec. 6, 2018

(87) PCT Pub. No.: WO2017/212985
PCT Pub. Date: Dec. 14, 2017

(65) Prior Publication Data
US 2019/0176457 A1    Jun. 13, 2019

(30) Foreign Application Priority Data

Jun. 6, 2016   (JP) .............................. JP2016-112421

(51) Int. Cl.
*B32B 43/00*   (2006.01)
*B32B 15/08*   (2006.01)
(Continued)

(52) U.S. Cl.
CPC ........ *B32B 43/006* (2013.01); *B23K 26/0006* (2013.01); *B23K 26/364* (2015.10);
(Continued)

(58) Field of Classification Search
CPC .................................................... B32B 43/006
See application file for complete search history.

(56) References Cited

U.S. PATENT DOCUMENTS

| | | | | |
|---|---|---|---|---|
| 5,264,469 A | * | 11/1993 | Mysliwczyk | C08G 59/1422 523/412 |
| 2003/0059673 A1 | * | 3/2003 | Langan | H01M 10/0436 429/127 |

(Continued)

FOREIGN PATENT DOCUMENTS

| JP | 63-064729 A | 3/1988 |
|---|---|---|
| JP | 07-148888 A | 6/1995 |

(Continued)

OTHER PUBLICATIONS

English Translation of International Search Report for PCT/JP2017/020110 dated Aug. 1, 2017.

(Continued)

*Primary Examiner* — Jeremiah R Smith
(74) *Attorney, Agent, or Firm* — Millen, White, Zelano & Branigan, P.C.; William Nixon

(57) ABSTRACT

A laminate material with a metal exposed portion is efficiently produced. A peeling step is performed in which a laser beam L is irradiated on a resin layer 17, 18 of a laminate raw material 10 in which a resin layer 17, 18 is laminated on at least one surface of a metal foil 11 to peel the resin layer 17, 18 and the metal foil 11 to thereby form a peeled portion 21, 22. Thereafter, the resin layers 17 and 18 corresponding to the peeled portions 21 and 22 are cut off to expose the metal foil 11.

8 Claims, 8 Drawing Sheets

(51) Int. Cl.

| | | |
|---|---|---|
| H01G 11/78 | (2013.01) | |
| B23K 26/402 | (2014.01) | |
| B32B 38/10 | (2006.01) | |
| B23K 26/00 | (2014.01) | |
| B23K 26/364 | (2014.01) | |
| B65D 1/22 | (2006.01) | |
| B23K 26/53 | (2014.01) | |
| H01M 50/10 | (2021.01) | |
| H01M 50/116 | (2021.01) | |
| H01M 50/124 | (2021.01) | |
| B23K 26/38 | (2014.01) | |
| B32B 7/12 | (2006.01) | |
| B32B 15/085 | (2006.01) | |
| B32B 15/088 | (2006.01) | |
| B32B 15/20 | (2006.01) | |
| H01M 10/058 | (2010.01) | |
| B23K 103/18 | (2006.01) | |
| B23K 103/16 | (2006.01) | |
| B23K 103/12 | (2006.01) | |
| B23K 103/08 | (2006.01) | |
| B32B 37/12 | (2006.01) | |
| B23K 103/10 | (2006.01) | |
| B23K 103/00 | (2006.01) | |
| B23K 101/36 | (2006.01) | |

(52) U.S. Cl.
CPC ............ *B23K 26/38* (2013.01); *B23K 26/402* (2013.01); *B23K 26/53* (2015.10); *B32B 7/12* (2013.01); *B32B 15/08* (2013.01); *B32B 15/085* (2013.01); *B32B 15/088* (2013.01); *B32B 15/20* (2013.01); *B32B 38/10* (2013.01); *B32B 43/003* (2013.01); *B65D 1/22* (2013.01); *H01G 11/78* (2013.01); *H01M 10/058* (2013.01); *H01M 50/10* (2021.01); *H01M 50/116* (2021.01); *H01M 50/124* (2021.01); *B23K 2101/36* (2018.08); *B23K 2103/08* (2018.08); *B23K 2103/10* (2018.08); *B23K 2103/12* (2018.08); *B23K 2103/172* (2018.08); *B23K 2103/18* (2018.08); *B23K 2103/26* (2018.08); *B23K 2103/42* (2018.08); *B32B 37/12* (2013.01); *B32B 2307/202* (2013.01); *B32B 2310/0843* (2013.01); *B32B 2311/24* (2013.01); *B32B 2323/10* (2013.01); *B32B 2377/00* (2013.01); *B32B 2435/02* (2013.01); *B32B 2439/00* (2013.01); *B32B 2439/70* (2013.01); *B32B 2439/80* (2013.01); *B32B 2457/10* (2013.01); *B32B 2553/00* (2013.01)

(56) References Cited

U.S. PATENT DOCUMENTS

| | | | |
|---|---|---|---|
| 2014/0065356 A1* | 3/2014 | Chow | B32B 27/36 |
| | | | 428/138 |
| 2014/0251533 A1* | 9/2014 | Lim | B23K 26/032 |
| | | | 156/247 |

FOREIGN PATENT DOCUMENTS

| | | | | |
|---|---|---|---|---|
| JP | 09-314736 A | | 12/1997 | |
| JP | 2010-149388 A | | 7/2010 | |
| JP | 2011-142332 A | | 7/2011 | |
| JP | 07148888 | * | 6/2013 | ........... B32B 15/085 |
| JP | 2013161674 A | | 8/2013 | |
| JP | 2014-071231 A | | 4/2014 | |
| JP | 2015205504 A | | 11/2015 | |
| JP | 2015-228365 A | | 12/2015 | |
| JP | 2016068968 A | | 5/2016 | |
| KR | 20150065606 A | | 6/2015 | |

OTHER PUBLICATIONS

English Abstract of JP-07-148888, Publication Date Jun. 13, 1995.
English Abstract of JP-2014-071231, Publication Date: Apr. 21, 2014.
English Abstract of JP-2010-149388, Publication Date: Jul. 8, 2010.
English Abstract of JP-2015-228365, Publication Date: Dec. 17, 2015.
English Abstract of JP-63-064729, Publication Date: Mar. 23, 1988.
English Abstract of JP-09-314736, Publication Date: Dec. 9, 1997.
English Abstract of JP-2013-161674, Publication Date: Aug. 19, 2013.
Office Action in corresponding Korean patent application 10-2018-7032049 dated May 22, 2020 (pp. 1-4 and English translation pp. 1-4).

* cited by examiner

METHOD OF PRODUCING LAMINATE MATERIAL

TECHNICAL FIELD

The present invention relates to a method of producing a laminate material used for a packaging body of a power storage device or a packaging material for food or pharmaceutical products.

BACKGROUND ART

In accordance with downsizing and weight reduction of a battery, such as, e.g., a battery for mobile communication terminal equipment, a battery for automobiles, a battery for regenerative energy recovery, a capacitor, and an all-solid state battery, in place of a conventionally used packaging body made of metal, a packaging body made of a laminate material in which resin films are bonded to both surfaces of a metal foil is increasingly used (see Patent Document 1).

In the laminate case for a capacitor as described in Patent Document 1, an electrode connection portion is formed by cutting off the resin film layer on the inner side of the laminate case to expose the metal foil, and an electrode terminal is formed by cutting off the resin film layer on the outer side of the laminate case to expose the metal foil. Since this type of laminate case requires no tab lead, downsizing and weight reduction of the capacitor can be attained.

Further, as a method of exposing a metal foil of a laminate material, the present applicant proposed a method. In the method, in a step of bonding a metal foil and a resin film, an adhesive agent unapplied portion is formed at an exposure target portion, and the resin film corresponding to the adhesive agent unapplied portion is cut off after the bonding step (see Patent Document 2). According to this method, since the metal foil and the resin film are not bonded at the exposure target portion, the resin film can be easily cut off and the metal foil surface will not be contaminated.

Furthermore, there is also a method in which in a step of bonding a metal foil and a resin film, a peelable sheet is bonded to the exposure target portion of the metal foil and then the resin film is bonded thereon, thereafter at the time of removing the resin film, the peelable sheet is removed with the peelable sheet bonded to the resin film.

PRIOR ART

Patent Document

[Patent Document 1] Japanese Unexamined Patent Application Publication No. 2013-161674
[Patent Document 2] Japanese Unexamined Patent Application Publication No. 2015-205504

SUMMARY OF THE INVENTION

Problems to be Solved by the Invention

In the method described in Patent Document 2, the size and forming position of the metal exposed portion need to be determined at the step of bonding the metal foil and the resin film and therefore cannot be changed after bonding. Therefore, when the shape or position of the metal exposed portion differs, a dedicated laminate material must be prepared for it. Further, a dedicated adhesive agent application roll is needed according to the shape, number, and position of the metal exposed portion, which results in an increased production cost.

Also, in the method of bonding a peelable sheet and cutting off a resin film and the peelable sheet, the size and forming position of the metal exposed portion have to be determined at the step of bonding the metal foil and the resin film.

Means for Solving the Problems

In view of the above-described technical background, the present invention aims to provide a method of efficiently producing a laminate material by standardizing a part of a production step of plural types of laminate materials different in shape, number, and position of a metal exposed portion.

That is, the present invention has the following configurations as recited in the following Items [1] to [8].

[1] A method of producing a laminate material, comprising: a peeling step of irradiating a laser beam on a resin layer side surface of a laminate raw material in which a resin layer is laminated on at least one surface of a metal foil to peel the resin layer and the metal foil to thereby form a peeled portion.

[2] The method of producing a laminate material as recited in the aforementioned Item [1], wherein the laser is any one of an excimer laser, a YAG laser, and a YVO4 laser, and has a wavelength of 150 nm to 550 nm and an output of 3 W or more.

[3] The method of producing a laminate material as recited in the aforementioned Item [1] or [2], further comprising a cutting-off step of cutting off the resin layer corresponding to the peeled portion to expose the metal foil to thereby form a metal exposed portion after the peeling step.

[4] The method of producing a laminate material as recited in the aforementioned Item [3], wherein the cutting off of the resin layer is performed with a physical blade or a laser blade.

[5] The method of producing a laminate material as recited in the aforementioned Item [1] or [2], wherein the laminate raw material is a double-sided laminate material in which a heat resistant resin layer is laminated on one of surfaces of the metal foil and a heat fusible resin layer is laminated on the other surface of the metal foil, and a first peeled portion is formed at a heat fusible resin layer side surface of the metal foil and a second peeled portion is formed at a heat fusible resin layer side surface or a heat resistant resin layer side surface of the metal foil.

[6] The method of producing a laminate material as recited in the aforementioned Item [5], wherein after the peeling step, a cutting-off step of cutting off of the heat fusible resin layer corresponding to the first peeled portion and the heat fusible resin layer or the heat resistant resin layer corresponding to the second peeled portion to expose the metal foil to thereby form a metal exposed portion is performed.

[7] A method of producing a packaging body for a power storage device, comprising: laminating two laminate materials prepared by the method described in the aforementioned Item [6] with the heat fusible resin layers facing inward; and heat sealing edges of the laminate materials to form a battery element chamber for accommodating a battery element in which a metal exposed portion by the first peeled portion faces an inside of the battery element chamber and a metal exposed portion by the second peeled portion is arranged on an outer surface of the laminate material.

[8] A method of producing a power storage device, comprising: sealing a battery element including a positive electrode element, a negative electrode element, a separator, and an electrolyte in the battery element chamber of the packaging body for a power storage device as recited in the aforementioned Item [7].

Effects of the Invention

According to the method of producing a laminate material as recited in the aforementioned Item [1], since the shape, size, and position of the peeled portion which later serves as a metal exposed portion is determined by the irradiation of the laser beam, multiple types of laminate materials different in shape, size, and position of the metal exposed portion can be produced from one type of laminate raw material. The laminate raw material which is the starting material of plural types of laminate materials is common, and it is possible to eliminate waste of materials and improve the production efficiency by the standardization of the laminate raw material.

According to the method of producing a laminate material as recited in the aforementioned Item [2], a peeled portion can be formed by using a specific laser beam in the peeling step.

According to the method of producing a laminate material as recited in the aforementioned Item [3] or [4], in the cutting-off step, a metal exposed portion can be formed by cutting off the resin layer corresponding to the peeled portion formed in the peeling step.

According to the method of producing a laminate material as recited in the aforementioned Item [5], the above-described effects can be obtained for a double-sided laminate material in which a resin layer is laminated on both surfaces of the metal foil.

According to the method of producing a laminate material as recited in the aforementioned Item [6], in the cutting-off step, metal exposed portions can be formed by cutting off the resin layer corresponding to the first and second peeled portions formed in the peeling step.

According to the method of producing a packaging body for a power storage device as recited in the aforementioned Item [7], the production efficiency of the laminate material of the material is improved, which in turn can improve the production efficiency of the packaging body.

According to the method of producing a power storage device as recited in the aforementioned Item [8], the production efficiency of the laminate material which is the material of the packaging body is improved, which in turn can improve the production efficiency of a no tab lead power storage device.

EMBODIMENTS FOR CARRYING OUT THE INVENTION

[Production Method of Laminate Material]

In the method of producing a laminate material according to the present invention, two steps are performed. The two steps include a peeling step in which a laser beam is irradiated on a laminate raw material to peel a metal foil and a resin layer at the irradiated portion to thereby form a peeled portion, and a cutting-off step in which the resin layer corresponding to the peeled portion is cut off to expose the metal foil to thereby form a metal exposed portion. The laminate material is sometimes subjected to various processing after the peeling step and before the cutting-off step, and therefore the production of an intermediate workpiece before the cutting-off step is also included in the present invention. Hereinafter, the laminate raw material, the peeling step, and the cutting-off step will be described in detail.

(Laminate Raw Material)

Figure 1:
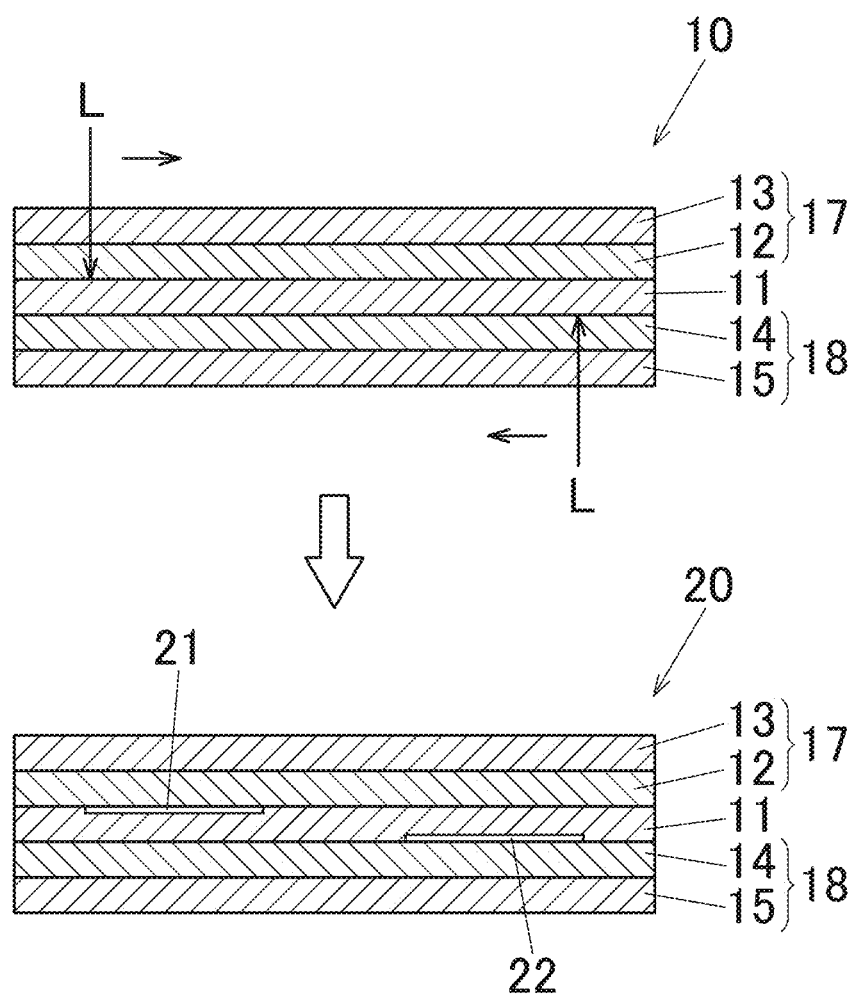
FIG. 1 is a cross-sectional view of a laminate raw material an intermediate workpiece produced by a peeling step.

In a laminate raw material, a resin layer is bonded and laminated on at least one surface of a metal foil. The laminate material 10 shown in FIG. 1 is used as a material of a packaging body for a power storage device, and is a double-sided laminate material in which resin layers 17 and 18 are laminated on both surfaces of a metal foil 11.

In the laminate raw material 10, a heat resistant resin layer 13 is bonded and laminated on one of surfaces of the metal foil 11 by an adhesive layer 12, and a heat fusible resin layer 15 is bonded and laminated on the other surface of the metal foil 11 by an adhesive layer 14. The resin layer 17 on one surface of the metal foil is two layers of the adhesive layer 12 and the heat resistant resin layer 13, and the resin layer 18 on the other surface of the metal foil is two layers of the adhesive layer 14 and the heat fusible resin layer 15.

The method of producing the laminate raw material 10 is not limited. The following is an example of the method of producing the laminate raw material.

An adhesive agent is applied to an entire area of at least one of the mating surfaces of the metal foil 11 and the heat resistant resin layer 13 to form an adhesive layer 12, and the metal foil 11 and the heat resistant resin layer 13 are bonded to each other. Similarly, the metal foil 11 and the heat fusible resin layer 15 are bonded by the adhesive layer 14. The bonding method is not limited, and a well-known method, such as, e.g., a dry lamination method, is appropriately used. Further, the order of bonding the heat resistant resin layer 13 and the heat fusible resin layer 15 is arbitrary.

Further, in cases where the heat resistant resin layer 13 itself has adhesiveness and therefore a predetermined adhesive force can be obtained, the heat resistant resin layer 13 can be directly bonded to the metal foil 11 without intervening the adhesive layer 12. In the same manner, the heat fusible resin layer 15 and the metal foil 11 can be directly bonded to each other. It is not limited that the heat resistant resin layer 13 and the heat fusible resin layer 15 are each composed of a single layer. The method of the present invention can be applied to a laminate raw material in which two or more layers are laminated.

(Peeling Step)

As shown in FIG. 1, in the peeling step, a laser beam L is irradiated to the laminate raw material 10 to peel off the resin layer 17, 18 from the metal foil 11 without cauterizing the resin layer 17, 18 to form a peeled portion 21, 22. The laminate raw material in which the peeled portion 21, 22 is formed is referred to as the intermediate workpiece 20.

In this step, a laser having a wavelength with less absorption to the resin layer 17, 18 is used at an output level that can desorb metal atoms from the surface layer of the metal foil 11. When irradiating the laser beam of such conditions on the laminate raw material 10, the laser beam passes through the resin layer 17, 18 without interfering therewith and reaches the surface of the metal foil 11. Metal atoms of the metal foil 11 are metal bonded to adjacent metal atoms, and metal atoms of the surface are bonded to the adhesive layers 12, 14 of the resin layer 17, 18. It is presumed that energy by the laser beam L is absorbed by metal atoms of the surface of the metal foil 11 to remove metal bond with adjacent metal atoms. Some of metal atoms released from the metal foil 11 by releasing the metal bonding is trapped by the resin layer 17, 18 (adhesive layer 12, 14), and some of the metal atoms again form a solid separated from the metal foil 11 by metal bonding or the metal foil 11 by detached metal atoms. As a mechanism of desorption of metal atoms, separation by sublimation of metal atoms or local melting of a metal foil surface can be considered. The state in which metal atoms out of metal bonding from the metal foil 11 are trapped in the resin layer 17, 18 (adhesive layer 12, 14) or the state in which metal atoms are detached from the metal foil 11 is maintained even after the laser irradiation. By moving the irradiation position of the laser beam L, metal atoms sequentially desorb from the surface of the metal foil 11, and the detached metal atoms are trapped in the resin layers 17 and 18 (adhesive layer 12, 14) or separated from the metal foil. As a result, peeling occurs in the foil of the metal foil 11 or at the bonding interface between the resin layer 17, 18 (adhesive layer 12, 14) and the metal foil 11, and the peeled portion 21, 22 is formed between the resin layer 17, 18 (adhesive layer 12, 14) and the metal foil 11. In the peeled portion 21, 22, the metal foil 11 loses metal atoms on the surface and the surface is slightly recessed. The lost metal atoms are added to the resin layer 17, 18 (adhesive layer 12, 14), or are present without being added to the resin layer 17, 18 (adhesive layer 12, 14). The action by the irradiation of the laser beam is short and local, and the heat generated by the energy absorbed by the metal atoms is promptly dissipated to the metal foil 11. Therefore, the peeled portion 21, 22 is formed without cauterizing the resin layer 17, 18. Note that the formation of the peeled portion 21, 22 causes a recess on the surface of the metal foil 11, but the metal atoms of the surface are merely lost. Therefore, the barrier property of the metal foil 11 is not impaired.

In the peeled portion 21, 22, even if there remain very few metal atoms adhered to the adhesive layer 12, 14 of the resin layer 17, 18 without breaking the metal bonding with the metal foil 11, in the cutting-off step of the next process, the resin layer 17, 18 can be removed without any problem.

When the peeled portion 21, 22 is formed, the gloss of the metal foil 11 is reduced. The change in gloss is a clear change visible through the peeled portion and the resin layer.

As the laser having the above-mentioned function, it is recommended to use any one of an excimer laser, a YAG laser, and a YVO4 laser, having a wavelength of 150 nm to 550 nm and an output of 3 W or more.

The laser beam having a wavelength of 150 to 550 nm has less interference with the resin layer 17, 18, and therefore it is suitable for this step of forming the peeled portion 21, 22 without cauterizing the resin layer 17, 18. As the excimer laser, an F2 laser having a wavelength of 157 nm, an ArF laser having a wavelength of 193 nm, and XeCl laser having a wavelength of 222 nm, and an XeF laser of a wavelength of 248 nm can be exemplified. As the YAG laser, a fourth harmonic wave having a wavelength of 260 nm or the vicinity thereof, a third harmonic wave having a wavelength of 350 nm or the vicinity thereof, and a second harmonic wave having a wavelength of 530 nm or the vicinity thereof can be exemplified. Further, as the YVO4 laser, a fourth harmonic wave having a wavelength of 260 nm or the vicinity thereof, a third harmonic wave having a wavelength of 350 nm or vicinity thereof, and a second harmonic wave having a wavelength of 530 nm or the vicinity thereof can be exemplified. Among the above-mentioned laser, a laser beam having a wavelength of particularly 530 nm or the vicinity thereof, which is a green wavelength range, is called a green laser.

Note that the metal forming the metal foil 11 differs in wavelength having a high absorption rate. Therefore, in this step, it is preferable to use a laser of a wavelength having a high absorption rate. Since the laser beam is applied on the surface of the metal foil 11, a laser having a wavelength suitable for the plating metal is selected for the plating foil. However, the wavelength that interferes with the resin layer 17, 18 is not preferable, and therefore the wavelength which exhibits the maximum absorption rate for the metal is not necessarily the best wavelength. Aluminum has a high absorption rate at 900 nm or the vicinity thereof, but light in the near-infrared region receives interference of the resin layer 17, 18, so a laser in the green region having a wavelength of 500 to 550 nm is suitable. Copper, nickel, and gold exhibits a high absorption rate at 500 nm or the vicinity thereof, so a laser in the green region having a wavelength of 500 to 550 nm is suitable. In the case of Fe, it exhibits a high absorption rate at 1,000 nm or the vicinity thereof but interferes with the resin layer, 17, 18, so a laser in the green region having a wavelength of 500 to 550 nm is suitable. Further, in the case of silver, it exhibits a high absorption rate at 300 nm or the vicinity thereof, so a laser in the ultraviolet region is suitable. As described above, the laser in the green region having a wavelength of 500 to 550 nm is suitable for many metals and can be recommended from the view point that the workability to metal is good.

The output of the laser is appropriately set according to the type of the metal foil 11, the type and thickness of the resin of the resin layer 17, 18, but in order to peel off the resin layer 17, 18 easily in the cutting-off step which will be described later, an output of 3 W or more is preferable. When it is less than 3 W, the peeling capability may be insufficient. A particularly preferable laser output is 3 W to 100 W.

(Cutting-Off Step)

Figure 2:
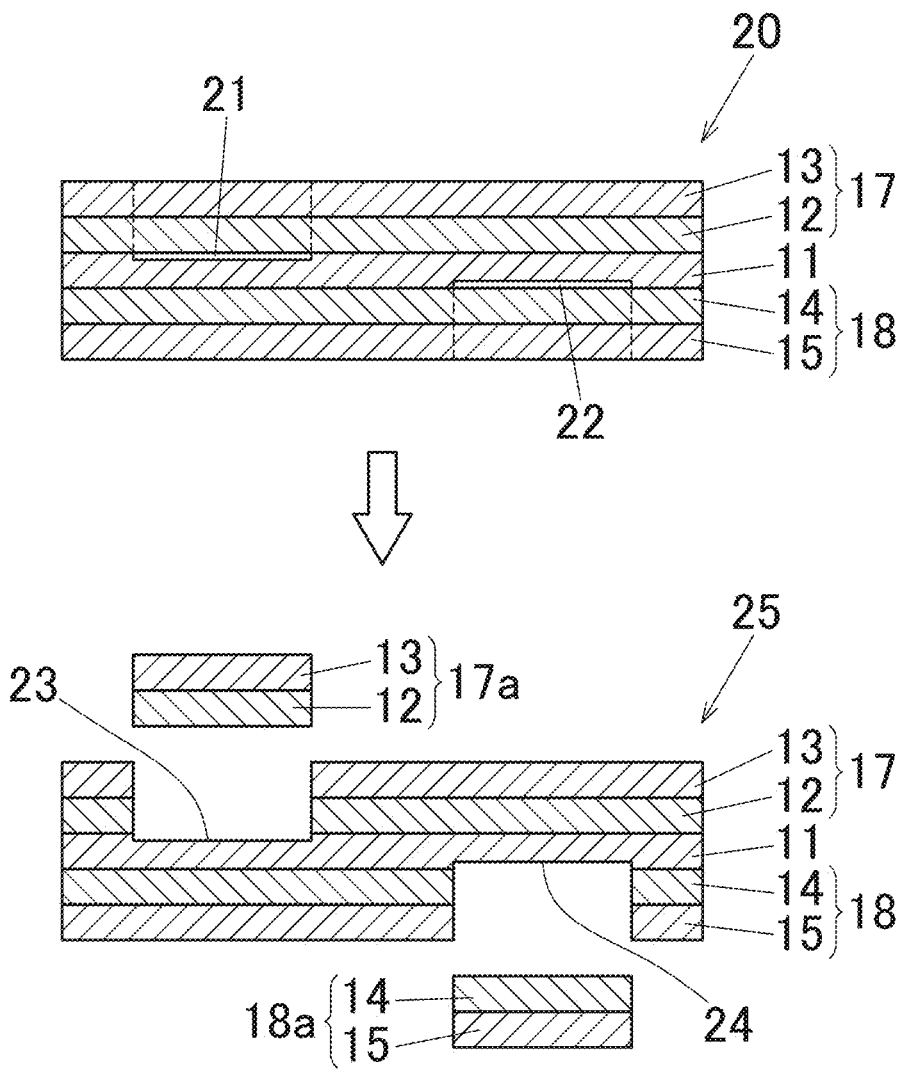
FIG. 2 is a cross-sectional view of a laminate material obtained by a cutting-off step.

As shown in FIG. 2, the resin layers 17 and 18 are cut along the contours of the peeled portions 21 and 22 of the intermediate workpiece 20 to cut off the resin layers 17a and 18a corresponding to the peeled portions 21 and 22. As described above, since the peeled portions 21 and 22 become discolored with reduced glossiness, the cutting position can be visually recognized with the naked eye. The metal foil 11 is exposed by cutting off the resin layer 17a, 18a, so that the metal exposed portion, 23, 24 is formed. Thus, a laminate material 25 is produced.

Cutting of the resin layer 17a, 18a is carried out by using a physical blade, such as, e.g., a Thomson sword and a rotary die, or a laser blade by a laser beam, such as, e.g., a $CO_2$ laser, having a high absorption rate for resin.

The laminate raw material 10 used in the method according to the present invention is a material obtained by laminating the resin layer 17, 18 on the entire surface of the metal foil 11. The shape, size, and forming position of the peeled portion 21, 22, i.e., the metal exposed portion 23, 24, can be arbitrarily set at the time of carrying out the peeling step. Therefore, a plurality of types of laminate materials 25 different in shape, size, number, and forming position of the metal exposed portion 23, 24 can be produced from one type of a laminate raw material 10. By standardizing the laminate raw material 10 which is a starting material, it is possible to eliminate waste of material and improve the production efficiency. Also, the method of the present invention can also be applied to an existing laminate material.

In the laminate raw material, a resin layer is laminated on at least one surface of a metal foil. In the method of the present invention, it is required to apply the peeling step and the cutting-off step described above to the resin layer side surface. The mode of the other surface of the metal foil is any one of modes (1) to (3) described below, and in any case, the method of the present invention can be applied.

(1) a resin layer is laminated
(2) a layer other than a resin layer is formed
(3) nothing is laminated The laminate raw material 10 in the illustrated example corresponds to the above-described mode (1), but in some cases, a peeling step and a cutting-off step are applied to only one surface of the laminate raw material 10 in which the resin layers 17 and 18 are laminated on both surfaces of the metal foil 11. The lamination mode of the laminate raw material and the surface to be processed differ depending on the application of the laminate material.

It is not limited that the cutting-off step is performed subsequent to the peeling step. Another step may be performed between the two steps. In cases where the above-described laminate material (1) is used as a packaging material, a flat sheet is formed into a case having a configuration capable of accommodating an item to be packaged, and then the item to be packaged is placed in the case. Thereafter, the heat fusible resin layers are heat sealed at its opening to thereby encapsulate the item to be packaged. The processing into a case capable of accommodating the item to be packaged is exemplified by processing in which a flat sheet is plastically formed into a three-dimensional shape by pressing, such as, e.g., bulging and drawing, and a bag-making processing in which a flat sheet is shaped into a bag shape. The peeling step and the cutting-off step can be performed at any time from a state of being a flat sheet to a state after performing the heat sealing as long as processing can be performed.

In the main body 40 of the packaging body 30 of the power storage device 100 which will be described later, a flat sheet is pressed to form the recess 41. The pressing may be performed at any time, before the peeling step, between the peeling step and the cutting-off step, or after the cutting-off step. For example, the formation of a plurality of peeled portions 21 and 22 can be performed by selecting the order of: performing the peeling step on the flat sheet laminate raw material 10 to enhance the work efficiency; performing the press working on the intermediate workpiece 20 to protect the metal foil 11 of the peeled portions 21 and 22 with the resin layers 17 and 18; and thereafter performing the cutting-off step. Although the metal exposed portion 24 facing the battery element chamber 60 must be formed by performing a cutting-off step before heat sealing, the metal exposed portion 23 on the outer surface of the packaging body 30 may be formed by performing a cutting-off step even after the heat sealing.

When the peeled portions 21 and 22 are formed by the above-described method to prepare the laminate 1, although the shape and size of the metal exposed portions 23 and 24 of the laminate material 25 which is a final product and the positions of the metal exposed portions 23 and 24 are also determined, in the intermediate workpiece 20, the metal foil 11 at the peeled portions 21 and 22 is covered and protected by the resin layers 17 and 18.

[Power Storage Device and its Packaging Body]

Figure 3:
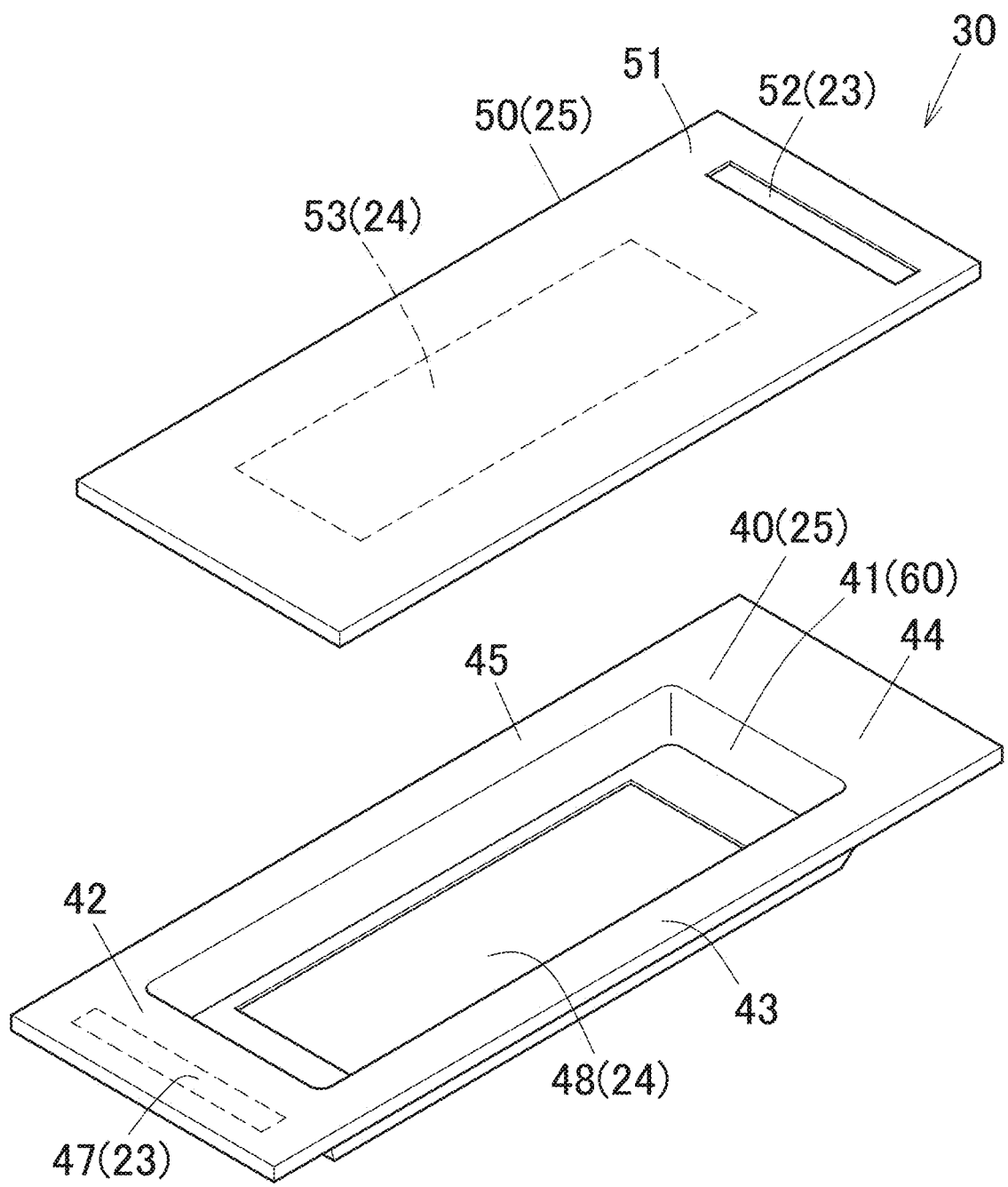
FIG. 3 is a perspective view of a packaging body of a power storage device.
Figure 4:
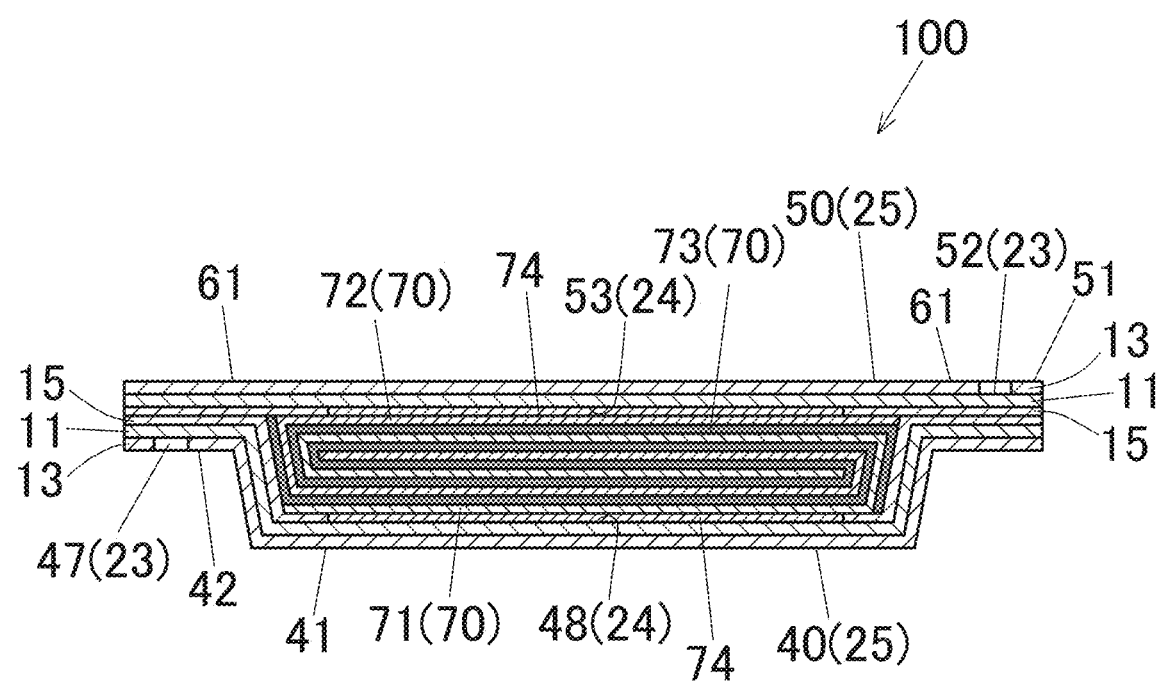
FIG. 4 is a cross-sectional view of a power storage device using the packaging body shown in FIG. 3.
Figure 5:
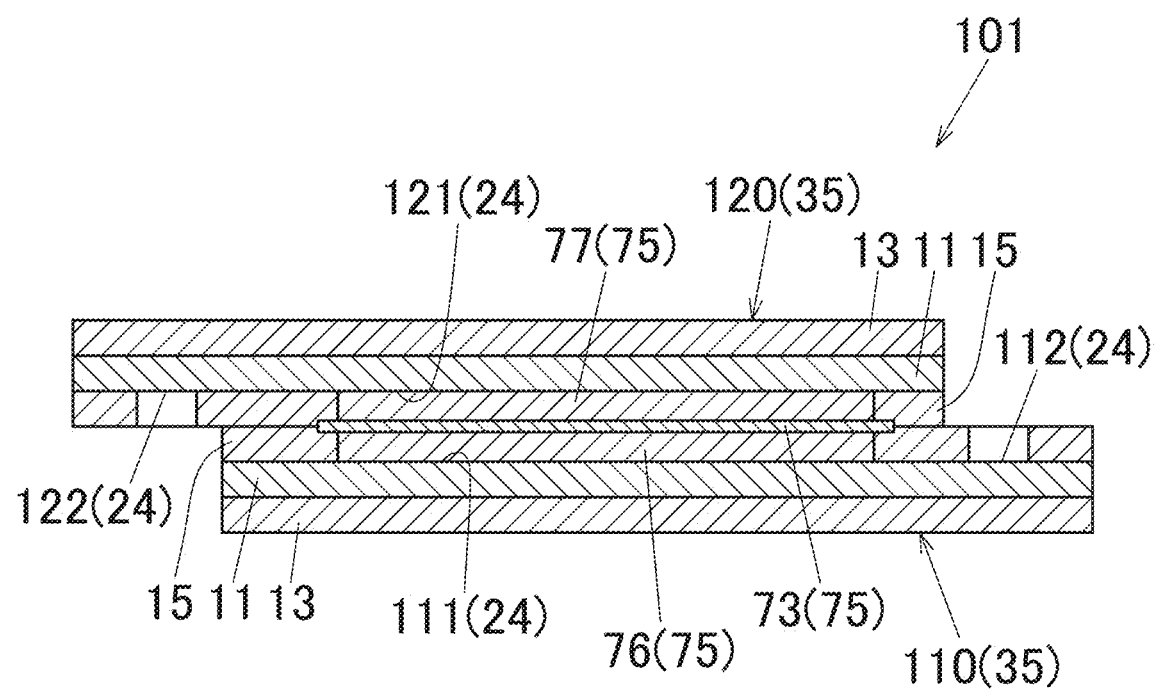
FIG. 5 is a cross-sectional view of a thin-type power storage device.

FIG. 3 to FIG. 5 show packaging bodies 30 and 35 for power storage devices made of the laminate material produced by the above-described method and power storage devices 100 and 101 using these packaging bodies 30 and 35.

(First Packaging Body and Power Storage Device)

FIG. 3 shows a packaging body 30 for a power storage device composed of laminate materials 25 (see FIG. 2) each having metal exposed portions 23 and 24 on both surfaces, and FIG. 4 shows a power storage device 100 using the packaging body 30. Note that in FIG. 4, the illustration of the adhesive layers 12 and 14 of the laminate material 25 is omitted and only the metal foil 11, the heat resistant resin layer 13, and the heat fusible resin layer 15 are illustrated.

The main packaging 30 is composed of a main body 40 having a rectangular recess 41 in a plan view and a lid 50 of a flat sheet, and the main body 40 and the lid 50 are each configured by a laminate material 25 in which metal exposed portions 23 and 24 are formed by performing the peeling step and the cutting-off step on required portions of the laminate raw material 10 shown in FIG. 1. In the packaging body 30, the space closed by covering the recess 41 of the main body 40 with the lid 50 becomes the battery element chamber 60.

The main body 40 has a recess 41 in which the heat fusible resin layer 15 side surface is recessed formed by subjecting a laminate material of a flat sheet to processing, such as, e.g., bulging and drawing and flanges 42, 43, 44, and 45 which extend substantially horizontally outward from the opening edge of the recess 41. The metal exposed portion 24 formed on the inner side of the bottom wall of the recess 41, i.e., the heat fusible resin layer 15 side surface, serves as a first inner conductive portion 48. The metal exposed portion 23 formed on the heat resistant resin layer 13 side surface of one of the short side flanges 42 serves as a first outer conductive portion 47.

The lid 50 has the same size as a size of the planar size of the main body 40. The metal exposed portion 24 formed at a position facing the first inner conductive portion 48 of the main body 40 on the heat fusible resin layer 15 side surface of the lid 50 facing the main body 40 serves as a second inner conductive portion 53. Further, the metal exposed portion 23 formed on the heat resistant resin layer 13 side surface of one of the short side edge portion 51 of the lid 50 serves as a second outer conductive portion 52.

When the main body 40 and the lid 50 are assembled, the first inner conductive portion 48 and the second inner conductive portion 53 face the inside of the battery element chamber 60, and the first outer conductive portion 47 and the second outer conductive portion 52 are exposed to the outer surface of the packaging body 30.

The battery element 70 is a laminate obtained by placing a separator 73 between a positive electrode 71 in which a positive electrode active material is coated on a metal foil and a negative electrode 72 in which a negative electrode active material is coated on a metal foil. The positive electrode 71 is a positive electrode element according to the present invention, and in the same manner, the negative electrode 72 is a negative electrode element.

The power storage device 100 is produced by connecting the end portion of the positive electrode 71 of the battery element 70 to the first inner conductive portion 48 of the main body 40 via the conductive binder 74, connecting the end portion of the negative electrode 72 to the second inner conductive portion 53 of the lid 50 via the conductive binder 74, and heat sealing the periphery of the battery element chamber 60 with an electrolyte injected to form the heat-sealed portion 61.

In the power storage device 100, the positive electrode foil 71 is configured to conduct to the metal foil 11 of the main body 40 at the first inner conductive portion 48 in the battery element chamber 60, and the first outer conductive portion 47 is configured to conduct to the outside on the outer surface of the packaging body 30. In the same manner, the negative electrode foil 72 is configured to conduct to the metal foil 11 of the lid 50 at the second inner conductive portion 53 in the battery element chamber 60, and the second outer conductive portion 52 is configured to conduct to the outside on the outer surface of the packaging body 30. The power storage device 100 exchanges electricity through the first outer conductive portion 47 and the second outer conductive portion 52 provided on the outer surface of the packaging body 30.

(Second Packaging Body and Power Storage Device)

In the packaging body of the power storage device, the outer conductive portion for exchanging electricity with the outside is not limited to be provided on the heat resistant resin layer 13 side surface of the laminate material, but it may be provided on the heat fusible resin layer 15 side surface. Further, the battery element is not limited to a laminate composed of a metal foil for a positive electrode and a metal foil for a negative electrode.

The power storage device 101 shown in FIG. 5 is a thin type device in which the packaging body 35 is composed of two flat laminate materials and a metal foil of a laminate material is used as a positive electrode or a negative electrode.

In the first laminate material 110 using the metal foil 11 as a positive electrode, two metal exposed portions 24 are formed on the heat fusible resin layer 15 side surface, and these are served as the first inner conductive portion 111 and the first outer conductive portion 112. In the second laminate material 120 using the metal foil 11 as a negative electrode, two metal exposed portions 24 are formed on the heat fusible resin layer 15 side surface, and these are served as the second inner conductive portion 121 and the second outer conductive portion 122.

The power storage device 101 is produced as follows. A positive electrode active material layer 76 is applied to the first inner conductive portion 111 of the first laminate material 110. A negative electrode active material layer 77 is applied to the second inner conductive portion 121 of the second laminate material 120. A separator 73 is sandwiched between two laminate materials 110 and 120, and the two laminate materials 110 and 120 are overlapped so that the end portions thereof are shifted to expose the first outer conductive portion 112 and the second outer conductive portion 122. In this overlapped state, the periphery of the first inner conductive portion 111 and that of the second inner conductive portion 121 are heat sealed. Note that the positive electrode active material layer 76 and the negative electrode active material layer 77 correspond to the positive electrode element and the negative electrode element in the present invention, respectively. Also note that the positive electrode active material layer 76, the negative electrode active material layer 77, the separator 73, and the electrolyte are the battery element 75, and the space where the battery element 75 exists is the battery element chamber (no reference numeral is allotted).

[Other Applications of Laminate Material]

The application of the laminate material according to the present invention is not limited to a packaging body of a power storage device, and the packaging body is not limited to the form shown in FIG. 3 and FIG. 5. Note that the surface, the position, and the number of the peeled portion to be provided differ depending on the application of the laminate material. Further, in the two packaging bodies 30 and 35, it is not limited that the outer conductive portion (metal exposed portion) of the packaging body of the power storage device is provided on the heat resistant resin layer 13 side surface. Like the packaging body 35 shown in FIG. 5, when two laminate materials are overlapped so that the end portions thereof are shifted, the heat fusible resin layer 15 is exposed to the outer surface of the packaging body 35. For this reason, an outer conductive portion can be provided on the heat fusible resin layer 15 side surface. In the two laminate materials constituting the packaging body, one of the laminate materials can be used so that the metal exposed portion formed on the heat fusible resin layer 15 side surface is used as an outer conductive portion, and the other laminate material can be used so that the metal exposed portion formed on the heat resistant resin layer 13 side surface is used as an outer conductive portion. On the other hand, the inner conductive portion facing the battery element chamber must be provided on the heat fusible resin layer 15 side surface. Therefore, in the laminate material used for a packaging body of a power storage device having no tab lead, it is required that metal exposed portions 23 and 24 are provided on both the heat resistant resin layer 13 side surface and the heat fusible resin layer 15 side surface, or a plurality of metal exposed portions 24 are provided on the heat fusible resin layer 15 side surface. That is, in an intermediate workpiece 20, a first peeled portion of the packaging body to be served as an inner conductive portion is formed on the heat resistant resin layer side surface, and a second peeled portion to be served as an outer conductive portion is formed on the heat resistant resin layer side surface or the heat fusible resin layer side.

Further, in the packaging body of the power storage device provided with tab leads, no metal exposed portion is provided on the heat fusible resin layer side. However, by providing a metal exposed portion on the heat resistant resin layer side, this metal exposed portion can be used for leakage check.

The laminate material according to the present invention can also be used as a packaging material for food and liquid in addition to a packaging body of an electric storage device. The surface for forming the metal exposed portion (peeled portion), and the number and the dimensions of the metal exposed portion (peeled portion) are not limited, and can be arbitrarily set according to the application of the laminate material. As an example of the application of the packaging material of the laminate material for food and liquid, a food container can be exemplified. In a laminate material for food containers, by forming a metal exposed portion on the heat resistant resin layer side surface which is the outer surface of the container and the heat fusible resin layer side surface which is the inner face of the container, it is possible to provide a food container capable of bringing a heating member into contact with the metal exposed portions or applying heat by Joule heat via the content.

[Constituent Material of Laminate Raw Material]

Although the present invention does not limit the materials of the respective layers constituting the laminate raw material 10, the following materials can be exemplified as preferable materials.

As the metal foil 11, an aluminum foil, a stainless steel foil, a nickel foil, a copper foil, a titanium foil, and a clad foil of these metals can be exemplified, and a plating foil plated on the aforementioned metal foil can also be exemplified. It is also preferable to form a chemical conversion coating on these metal foils. The thickness of the metal foil 11 is preferably 7 μm to 150 μm.

As the heat resistant resin constituting the heat resistant resin layer (outer layer) 13, a heat resistant resin which does not melt at the heat sealing temperature when heat-sealing the laminate materials is used. As the heat resistant resin, it is preferable to use a thermoplastic resin having a melting point higher than the melting point of the thermoplastic resin constituting the heat fusible resin layer 15 by 10° C. or more, and it is particularly preferable to use a thermoplastic resin having a melting point higher than the melting point of the thermoplastic resin by 20° C. or more. For example, a polyamide film, a polyester film, etc., can be exemplified, and these stretched films are preferably used. Among them, in terms of formability and strength, a biaxially stretched polyamide film or a biaxially stretched polyester film, or a multilayer film containing these films is particularly preferable. Further, it is preferable to use a multilayer film in which a biaxially stretched polyamide film and a biaxially stretched polyester film are laminated. As the polyamide film, it is not particularly limited, but for example, a polyamide 6 film, a polyamide 66 film, and a polyamide MXD film can be exemplified. Further, as the biaxially stretched polyester film, a biaxially stretched polybutylene terephthalate (PBT) film, a biaxially stretched polyethylene terephthalate (PET) film, etc., can be exemplified. In addition, the heat resistant resin layer 13 may be formed of a single layer, or may be formed of multiple layers made of, for example, a PET film/a polyamide film. Further, the thickness is preferably within the range of 9 μm to 50 μm.

As the thermoplastic resin constituting the heat fusible resin layer 15, in terms of chemical resistance and heat sealability, the thermoplastic resin is preferably composed of polyethylene, polypropylene, an olefin based copolymer, an acid modified product thereof, and an ionomer thereof. As the olefin based copolymer, an EVA (ethylene-vinyl acetate copolymer), an EAA (ethylene-acrylic acid copolymer), and an EMAA (ethylene-methacrylic acid copolymer) can be exemplified. Further, a polyamide film (for example, polyamide 12) or a polyimide film can also be used. Further, the thickness is preferably within the range of 20 μm to 80 μm.

As the adhesive agent 12 on the heat resistant resin layer 13 side, for example, it is preferable to use an adhesive agent containing a two-part curing type polyester-urethane based resin including a polyester resin as a main agent and a polyfunctional isocyanate compound as a curing agent, or a polyether-urethane based resin. On the other hand, as the adhesive agent 14, 24 on the first heat fusible resin layer 15 side, an adhesive agent, such as, e.g., a polyurethane based adhesive agent, an acrylic based adhesive agent, an epoxy based adhesive agent, a polyolefin based adhesive agent, an elastomer based adhesive agent, a fluorine based adhesive agent, etc., can be exemplified.

EXAMPLE

A peeling step and a cutting-off step were performed on both surfaces of the laminate raw material 10 having the laminate structure shown in FIG. 1 to form metal exposed portions 23 and 24.

Each layer of the used laminate raw material 10 was as follows. The laminate raw material 10 was prepared by bonded resin films on both surfaces of the metal foil 11 by a dry lamination method.

Metal foil 11: 40 μm thick aluminum foil (JIS H4160, A8079H)

Heat resistant resin layer 13: 25 μm thick biaxially stretched polyamide film

Adhesive layer 12: two-part curing type polyester-urethane based adhesive agent, coating amount of 4 $g/m^3$ Heat fusible resin layer 15: 40 μm thick unstretched polypropylene film Adhesive layer 14: two-part curing type acid-modified polypropylene based adhesive agent, coating amount of 3 $g/m^3$

[1] Example 1: Heat Fusible Resin Layer 15 Side Surface (Peeling Step)

Using a YVO4 laser having a wavelength of 523 nm, an output of 15 W, and a spot diameter of 2.2 mm, a laser beam was irradiated while scanning at a scanning speed of 400 m/s to a region of 30 mm×40 mm on the heat fusible resin layer 15 side surface of the laminate raw material 10.

Figure 6:
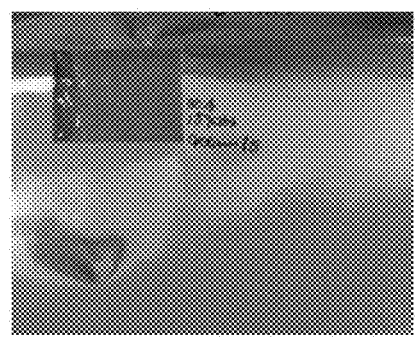
FIG. 6 is an appearance photograph of an intermediate workpiece after performing the peeling step according to Example 1.

FIG. 6 shows a photograph of the appearance of the laminate raw material 10, i.e., the intermediate workpiece 20, after irradiation. The dark colored rectangle shape shown at the top left of this photograph indicates an irradiated portion, and the irradiated portion can be identified with the naked eye.

Figure 7:
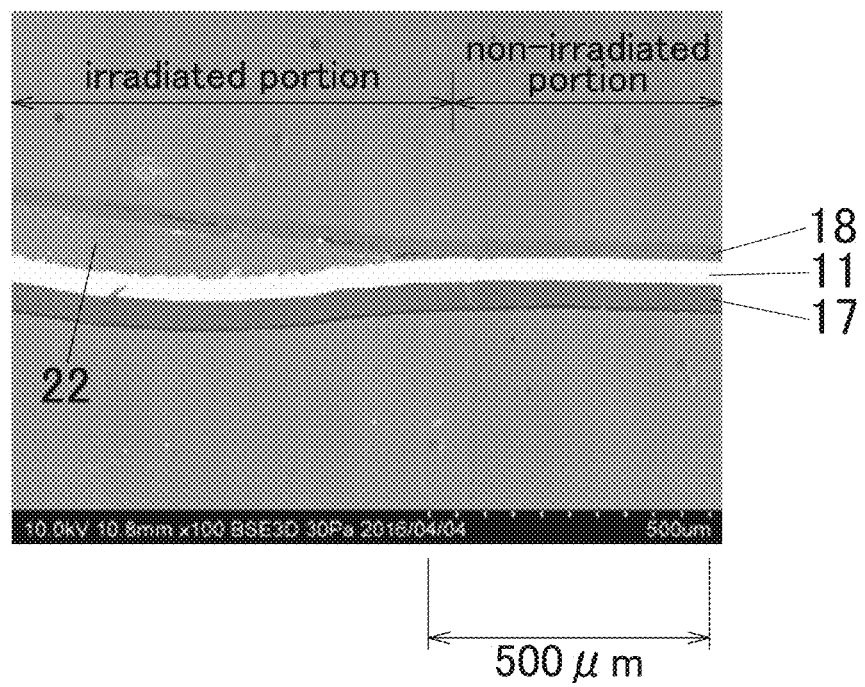
FIG. 7 is a cross-sectional SEM image of the intermediate workpiece shown in FIG. 6.

FIG. 7 shows a cross-sectional SEM image after irradiation. In the SEM image, the central white portion indicates the metal foil 11, the gray layer above the metal foil 11 indicates the resin layer 18 composed of the heat fusible resin layer 15 and of the adhesive layer 14, and the gray layer below the metal foil 11 indicates the adhesive layer 17 composed of the heat resistant resin layer 13 and the adhesive layer 12. As shown in FIG. 7, it was confirmed that the metal foil 11 and the resin layer 18 were peeled from each other at the laser irradiated portion and a peeled portion 22 was formed.

(Cutting-Off Step)

The periphery of the peeled portion 22 formed by the peeling step was cut with a laser blade and the resin layer 18a corresponding to the peeled portion 21 was cut off. The laser blade was a $CO_2$ laser beam with an output of 15 W and a spot diameter of 2.2 mm, and scanned at a scanning speed of 1,000 mm/s. It was confirmed that the metal foil 11 was exposed by the cutting of the resin layer 18a and the metal exposed portion 24 was formed.

[2] Example 2: Heat Resistant Resin Layer Side 13 Surface

Using a YAG laser beam having a wavelength of 355 nm, an output of 5 W, and a spot diameter of 2.2 mm, an area of 1 mm×30 mm on the heat resistant resin layer 13 side surface of the laminate raw material 10 was scanned with the laser beam at a scanning speed of 300 m/s.

Figure 8:
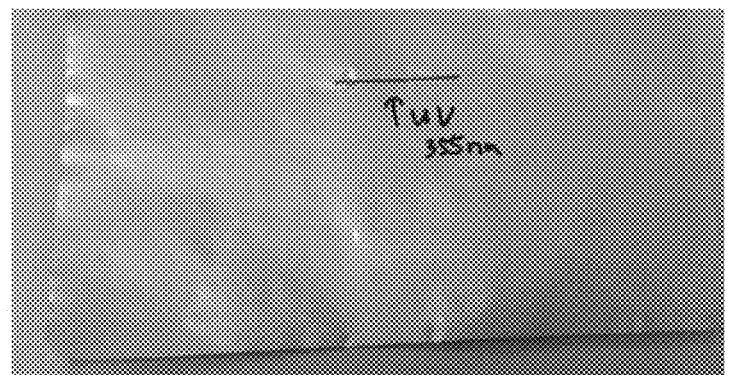
FIG. 8 is an appearance photograph of the intermediate workpiece after performing the peeling step according to Example 2.

FIG. 8 shows a photograph of the appearance of the laminate raw material 10, i.e., the intermediate workpiece 20, after irradiation, i.e., the intermediate workpiece 20. The line-shaped portion at the center upper portion of this photograph indicates an irradiated portion, and the irradiated portion can be identified with the naked eye.

Figure 9:
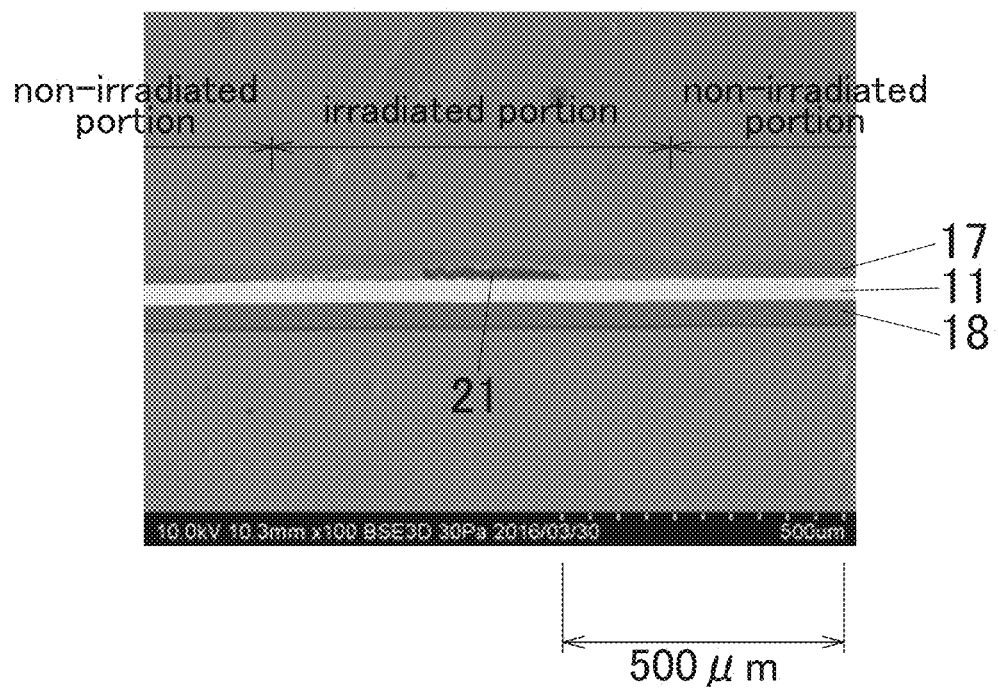
FIG. 9 is a cross-sectional SEM image of the intermediate workpiece shown in FIG. 8.
Figure 10:
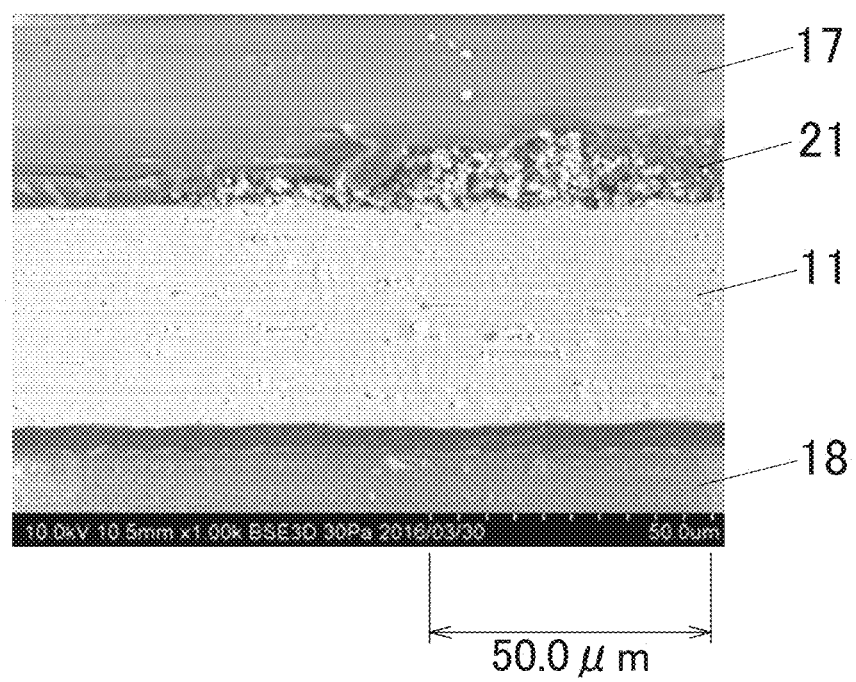
FIG. 10 is a partially enlarged view of FIG. 9.

Also, FIG. 9 shows a cross-sectional SEM image after the irradiation, and FIG. 10 shows the partially enlarged image of FIG. 9. In FIG. 9 and FIG. 10, the white portion at the center indicates the metal foil 11, the gray layer above the metal foil 11 indicates the resin layer layer 17 composed of the heat resistant resin layer 13 and the adhesive layer 12, and the gray layer below the metal foil 11 indicates the resin layer 18 composed of the heat fusible resin layer 15 and the adhesive layer 14. As shown in FIG. 9 and FIG. 10, it was confirmed that the metal foil 11 and the resin layer 17 were peeled from each other at the laser irradiated portion and the peeled portion 21 was formed.

(Cutting-Off Step)

The periphery of the peeled portion 21 formed by the peeling step was cut with the same method as in Example 1 to cut off the resin layer 17a corresponding to the peeled portion 21. It was confirmed that the metal foil 11 was exposed by cutting off the resin layer 17 and the metal exposed portion 23 was formed.

The present application claims priority to Japanese Patent Application No. 2016-112421 filed on Jun. 6, 2016, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope according to the present invention.

INDUSTRIAL APPLICABILITY

The laminate material produced by the method according to the present invention can be suitably used as a packaging body material in which a part of a resin layer is removed to expose a metal foil.

DESCRIPTION OF REFERENCE SYMBOLS

10: laminate raw material
11: metal foil
12, 14: adhesive layer
13: heat resistant resin layer
15: heat fusible resin layer
17, 18: resin layer
20: intermediate workpiece
21, 22: peeled portion
23, 24: metal exposed portion
25: laminate material
30, 35: packaging body
40: main body (laminate material)
47: first outer conductive portion (metal exposed portion)
48: first inner conductive portion (metal exposed portion)
50: lid (laminate material)
52: second outer conductive portion (metal exposed portion)
53: second inner conductive portion (metal exposed portion)
60: battery element chamber
70, 75: battery element
100, 101: power storage device
110: first laminate material (laminate material)
111: first inner conductive portion (metal exposed portion)
112: first outer conductive portion (metal exposed portion)
120: second laminate material (laminate material)
121: second inner conductive portion (metal exposed portion)
122: second outer conductive portion (metal exposed portion)

The invention claimed is:

1. A method of producing a laminate material, comprising:
a peeling step of irradiating using a laser beam on a resin layer side surface of a laminate raw material in which a resin layer is laminated on at least one surface of a metal foil to peel the resin layer and the metal foil to thereby form a peeled portion,
wherein the metal foil is an aluminum foil,
wherein the aluminum foil and the resin layer are bonded via an adhesive layer,
wherein the peeled portion is identifiable by reducing the gloss of the aluminum foil,
wherein the peeling step includes forming the peeled portion by peeling at a bonding interface between the adhesive layer and the aluminum foil to form a recess in a surface of the aluminum foil thereby reducing a thickness of the aluminum foil.

2. The method of producing a laminate material as recited in claim 1, wherein
the laser is any one of an excimer laser, a YAG laser, and a YVO4 laser, and has a wavelength of 150 nm to 550 nm and an output of 3 W or more.

3. The method of producing a laminate material as recited in claim 1, further comprising:
a cutting-off step of cutting off the resin layer corresponding to the peeled portion to expose the metal foil to thereby form a metal exposed portion after the peeling step.

4. The method of producing a laminate material as recited in claim 3, wherein
the cutting off of the resin layer is performed with a physical blade or a laser blade.

5. The method of producing a laminate material as recited in claim 1, wherein
the laminate raw material is a double-sided laminate material in which a heat resistant resin layer is laminated on one of surfaces of the metal foil and a heat fusible resin layer is laminated on the other surface of the metal foil, and
a first peeled portion is formed at a heat fusible resin layer side surface of the metal foil and a second peeled portion is formed at a heat fusible resin layer side surface or a heat resistant resin layer side surface of the metal foil.

6. The method of producing a laminate material as recited in claim 5, wherein
after the peeling step, a cutting-off step of cutting off of the heat fusible resin layer corresponding to the first peeled portion and the heat fusible resin layer or the heat resistant resin layer corresponding to the second peeled portion to expose the metal foil to thereby form a metal exposed portion is performed.

7. A method of producing a packaging body for a power storage device, comprising:
laminating two laminate materials prepared by the method described in claim 6 with the heat fusible resin layers facing inward; and heat sealing edges of the laminate materials to form a battery element chamber for accommodating a battery element in which a metal exposed portion by the first peeled portion faces an inside of the battery element chamber and a metal exposed portion by the second peeled portion on an outer surface of the laminate material is arranged.

8. A method of producing a power storage device, comprising:
sealing a battery element including a positive electrode element, a negative electrode element, a separator, and an electrolyte in the battery element chamber of the packaging body for a power storage device as recited in claim 7.

* * * * *